United States Patent Office 2,995,538
Patented Aug. 8, 1961

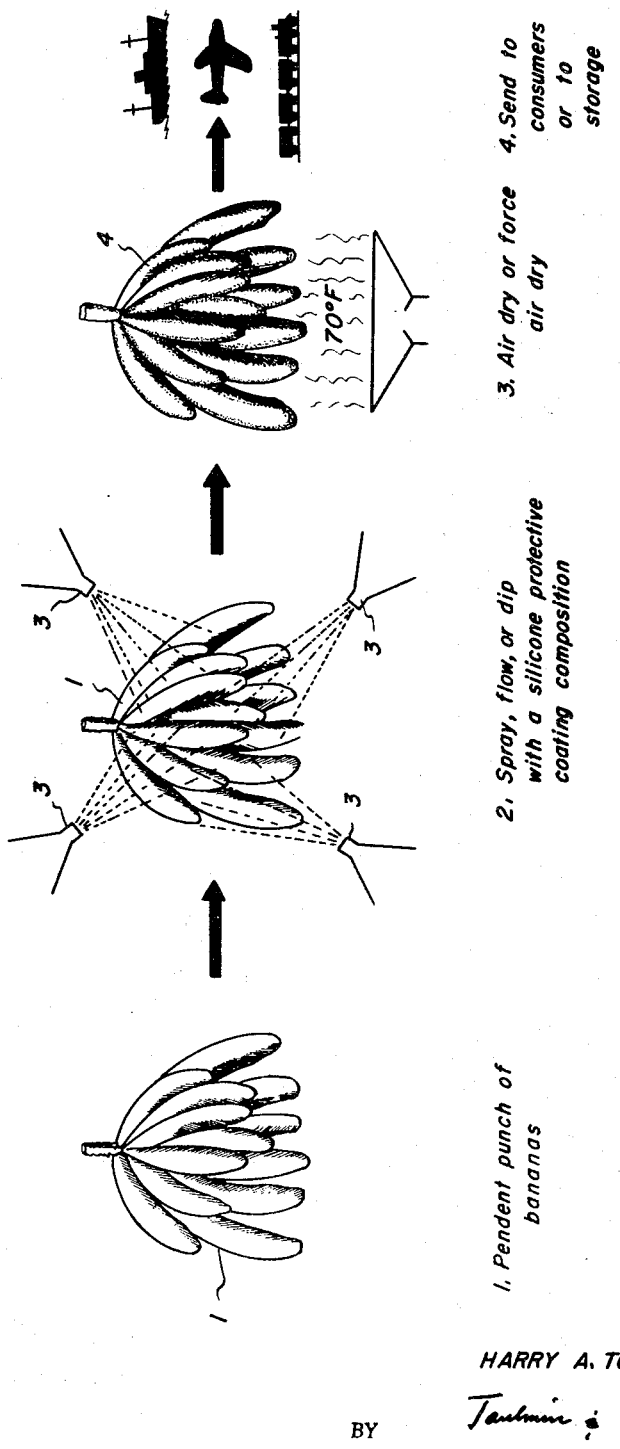

2,995,538
SILICONE RESINOUS COMPOSITION CONTAINING CAROTENE FOR COATING BANANAS
Harry A. Toulmin, Jr., Dayton, Ohio, assignor to The Commonwealth Engineering Company of Ohio, Dayton, Ohio
Filed Mar. 14, 1957, Ser. No. 645,992
2 Claims. (Cl. 260—33.4)

This invention relates to a process for treating fruits, vegetables and the like, and more particularly to a method for treating bananas to provide the same with a protective silicone resin coating which is flexible and tough.

While it is known to wash fruits and vegetables and to apply a wax coating to the same, such treatment has not been satisfactory for preserving bananas which bruise easily and tend to deteriorate rapidly during shipment and storage.

The present invention provides a protective coating for bananas which not only gives the banana a pleasing color but preserves and protects the fruit during storage and while on display for ultimate sale to the consumer.

It is an object of this invention to provide a coating composition for treating bananas and which is non-toxic and protects the fruit during shipment and storage.

Another object is to provide a protective coating for bananas which when applied to the skin of the fruit and dried forms a flexible, non-oxidizing protective coating therefor.

Another object is to provide a relatively inexpensive method of treating bananas to provide the same with a flexible protective color coating and which may be readily applied as by spraying, brushing or dipping.

Another object of the invention is to provide a coating composition for bananas to give the same a pleasing color and which, upon application, air dries to form a thin, flexible protective covering for preserving the fruit.

Another object is to provide a method of preserving bananas by applying to the raw clean fruit a silicone resin coating, which coating may contain edible coloring matter.

These and other objects and advantages of this invention are more particularly pointed out in the following description taken in connection with the drawings which illustrate diagrammatically a preferred method of carrying out the process in the treatment of bananas.

Referring to the drawing—

Reference character 1 illustrates a pendent bunch of bananas which is suitably suspended for inspection and treatment in accordance with this invention. Thereafter the bananas are coated with a silicone protective coating compositon and air dried. The silicone coating is suitably applied to the bananas in bunches as a spray, as illustrated in the drawing, the coating being directed thereon by the spray gun nozzles 3. Thereafter, the coated bananas, as indicated at 4, are dried by the application of ambient air at room temperature (approximately 70° F.) for one hour to force air dry the coating and provide a finished fruit ready for storage or sale to the consumer.

The spray nozzles for applying the protective coating are suitably spaced around the banana hand or bunch, as illustrated in the drawing, so as to apply the coating uniformly and evenly over the entire surface of the fruit and stem portions. Natural coloring matter is preferably added, e.g., as extracted from the rind of a ripened banana, such as coloring composition being composed principally of carotene ($C_4OH_{56}$) and xanthophyll ($C_4OH_{56}O_2$) pigments and comprises the carotenoids found in the yellow covering of the ripe fruit. This yellow-orange coloring pigment may be extracted from the banana peeling oils by heating and agitating the same with activated carbon, the residue left after filtration and consisting of the carbon sludge contains the yellow pigments and especially carotene in relatively high concentration.

A suitable coloring extract which may be incorporated in the coating composition contains 5 to 25% by weight pigment and the remainder ethyl alcohol. The coloring extract is admixed with the silicone resin solution to provide a suitable color coating composition and to which is incorporated a preservative and anti-oxidizing agent.

In preparing the silicone solution, suitable siloxane resins may be used, particularly those having an $r/Si$ ratio of from about 0.6 to 1.1 in the $r/Si$ ratio, $r$ represents the total number of non-hydrolyzable radicals attached to silicon atoms in the molecules of the siloxanes and Si the total number of silicon atoms therein.

These siloxane resins are bodied to a substantially cured, tack-free state whereby films of the resin dry at ordinary temperatures or by forced air dry without requiring baking. The resins are heat-bodied by slowly heating the same at temperatures ranging between about 175° and 250° C. until a viscous resinous mass is produced. Heating the resin for a few minutes to one hour, or an hour and a half, is sufficient to obtain a substantially tack-free resin and which may be cut with organic solvents to produce useful coatings in accordance with this invention. High viscosity bodied resins may be dissolved in lower aliphatic organic solvents such as 1-butanol, 1-propanol and aromatic hydrocarbons, e.g., benzene, toluene. Suitable mixtures of the alcohols and hydrocarbon solvents are preferably used.

An organosilicon resinous vehicle which may be used and which in thin films air dries to tack-free coatings may be made as described in U.S. Patent No. 2,679,496. A typical example of such a resin solution or vehicle for use in preparing air drying silicone resinous coatings for bananas in accordance with this invention is as follows, the parts being by weight unless otherwise stated:

SILICONE RESIN A

A mixture comprising 348 grams of cyclohexyltrichlorosilane, 164 grams of amyltrichlorosilane, 131 grams of ethyltrichlorosilane and 136 grams of silicon tetrachloride is dissolved in 900 ml. of butyl acetate. The resultant solution is added slowly with stirring to 2000 ml. of water at a temperature of 5° C. The rate of addition of solution to water is adjusted so that the temperature of the mixture does not rise above 10° C.

The resin layer formed is separated from the water by decanting and the resultant resin distilled to remove the organic solvent and water, the heat being continued thereafter at 150° C. to 200° C. for ten minutes to body the resin. Thereafter, the resin is diluted to 50 percent solids by the addition of a solvent consisting of a mixture containing equal parts by volume of toluene and 1-butanol.

SILICONE RESIN B

A modified resin solution is made as in resin A replacing the cyclohexyltrichlorosilane with an equimolar proportion of amyltrichlorosilane. The resulting resin is bodied at 230° C. for two hours to produce a tack-free gum-like resin which is dissolved to about 60 percent solids concentration in a 50–50 volume mixture of toluene and isopropyl alcohol.

A coating composition useful for treating bananas is as follows, the percent being by weight:

Example I

| | Percent |
|---|---|
| Silicone resin A (50% solids) | 80 |
| Carotene (20% carotene in ethyl alcohol) | 19 |
| 1-methylol 5,5 dimethyl hydantoin | 1 |

Example II

| | |
|---|---|
| Silicone resin B (60% solids) | 85 |
| Carotene coloring solution (Ex. I) | 14 |
| 1-methylol 5,5 dimethyl hydantoin | 1 |

In the silicone resinous coating given the resin provides a tough, flexible coating film having a yellow carotene color, and the hydantoin is added to prevent bacterial and mold growth and to serve as an anti-oxidant. After spray coating the fruit with the silicone resin solution, the coating is dried by circulating air thereon (72° F.) for one hour.

Other organo-silicon compounds may be used in place of the silicone resins described which will provide a thin, tack-free layer or coating on the fruit and which dries to a flexible, crack-resistant film. The term "silicones" refers generally to organo-silicon compounds obtained by linking silicon atoms to carbon atoms or radicals such as alkyl, aryl or aralkyl and described as alkylated chains of alternate silicon atoms and oxygen atoms, and which may contain side chains, rings and cross-links. For the present invention, it is preferred to make use of organo-silicon resin coatings produced from a mixture of silanes and such as provide siloxanes having an r/Si ratio below 1, which resinous mass can be heat-bodied to a tack-free state. The resultant silicone resins may be dissolved in organic solvent and applied onto the peel of the bananas and air dried to provide the fruit with a flexible, non-toxic protective coating film. After application of the silicone resin coating, the organic solvent is evaporated at ordinary room temperature without baking.

Where the silicone resin coating is desired without coloring, the same may be provided by omitting the carotene constituent in Examples I and II.

As a further modification, other anti-oxidants and preservatives than hydantoin may be used. For example, ascorbic acid, adenosine triphosphate, hydroquinone and the like. Use of 0.5 to 1% of these compounds in the coating composition prevents browning of the fruit. As a mold inhibitor diphenyl also may be used.

The coloring extract, as made from ripe banana peelings, also contains water-soluble non-carotenoid pigments, such as anthocyanin. The presence of these water-soluble pigments is desirable inasmuch as they function as an emulsifier for the carotenoid pigments which are soluble in fats and oils. To further stabilize the color pigments there may be added about 0.01 to 0.10% by weight of naphthol-yellow S to the coloring matter. The silicone resin coating composition of Examples I and II are edible and provide a fruit having the natural color of the ripe banana. The fruit thus treated with the silicone resin coating composition, with or without the addition of the coloring substance as contained in the peel of the mature, ripe fruit, is thus made ready for marketing or storage.

It is to be understood that while the invention has been described with particular reference to bananas, and a preferred method of treatment described, various modifications and changes which will occur to those skilled in the art may be made to suit different conditions and products treated without departing from the spirit and scope of the invention, and which is more specifically set out in the claims.

What is claimed is:

1. A coating composition for application as a spray coating to fresh banana fruit and which dries to provide a yellow carotene coloring and protective coating for the fruit, said coating composition comprising a silicone resin admixed with a minor percent amount by weight of a coloring solution composed of carotene dissolved in ethyl alcohol and to which is incorporated approximately 1% by weight of 1-methyl-5,5-dimethyl hydantoin as an antioxidant and preservative said silicone resin being produced by mixing 348 grams of cyclohexyltrichlorosilane, 164 grams of amyltrichlorosilane, 131 grams of ethyltrichlorosilane, and 136 grams of silicone tetrachloride, the constituents being dissolved in 900 ml. of butylacetate, the resultant solution being added slowly with stirring to 2000 ml. of water at a temperature of 5° C., and the resin layer formed thereon being separated from the water by decanting and distillation to remove organic solvents and water, and then diluting the resin residue to 50% solids by the addition of a solvent consisting of a mixture of equal parts by volume of toluene and 1-butanol.

2. A coating composition for application as a spray coating to fresh banana fruit as set forth in claim 1 and which dries to provide a coloring and protective coating for the fruit, and wherein the silicone resin is modified by replacing cyclohexyltrichlorosilane with an equal molar portion of amyltrichlorosilane, and the resultant resin being bodied at 230° C. for a time sufficient to produce tack-free gummy resin and which is dissolved to about 60% solids in an organic solvent mixture comprising equal parts by volume of toluene and isopropyl alcohol.

References Cited in the file of this patent

UNITED STATES PATENTS

| | | |
|---|---|---|
| 2,070,936 | Trowbridge | Feb. 16, 1937 |
| 2,474,704 | Thayer | June 28, 1949 |
| 2,512,192 | Yen | June 20, 1950 |
| 2,611,708 | Owens et al. | Sept. 23, 1952 |
| 2,679,496 | Bunnell | May 25, 1954 |
| 2,703,288 | Worson | Mar. 1, 1955 |
| 2,743,192 | White | Apr. 24, 1956 |

OTHER REFERENCES

"Food Industries," January 1951, pages 44–46, 194.
"Official Digest," November 1953, pages 810–812.